Oct. 2, 1956 T. LINK 2,764,907

KEY MOUNTING FOR ACCORDIONS

Filed May 23, 1952 4 Sheets-Sheet 1

INVENTOR:
TRAUGOTT LINK
BY [signature]
AGT.

INVENTOR:
TRAUGOTT LINK
BY Leon M. Strauss
Atty

KEY MOUNTING FOR ACCORDIONS

Filed May 23, 1952 4 Sheets-Sheet 3

INVENTOR:
TRAUGOTT LINK
BY [signature] AGT.

KEY MOUNTING FOR ACCORDIONS

Filed May 23, 1952 4 Sheets-Sheet 4

INVENTOR:
TRAUGOTT LINK
BY Leon M. Strauss
AGT.

2,764,907

KEY MOUNTING FOR ACCORDIONS

Traugott Link, Zurich, Switzerland

Application May 23, 1952, Serial No. 289,520

Claims priority, application Switzerland May 24, 1951

8 Claims. (Cl. 84—434)

This invention relates to a key mounting for musical instruments, such as accordions having as bearing points for each key two knife-edges each co-operating with a conjugate notch and arranged in one straight line at a distance from one another, the knife-edges and the notches coordinated therewith being pressed against one another by separate means.

In known key mountings of this kind the action of the pressure is disadvantageous because the direction of pressure of said means runs outside the knife-edge line, and furthermore the accessibility of the knife-edges of a single key is often restricted in that access to the knife-edges of a particular key cannot be obtained without at the same time releasing the means of pressing against one another the knife-edges and conjugate notches of other keys.

The present invention aims at overcoming these and other disadvantages.

To this end, means are provided for pressing against one another the knife-edges and conjugate notches appertaining to each key, said means consisting of at least one holder which is connected to stationary knife-edges and of which the direction of pressure coincides with the knife-edge line, i. e., passes substantially through the line joining said knife-edges, and of a counter-holder which is held by the said holder and which presses against the part connecting the key with the key-wire, these means being arranged between the bearing points of the key, the holder passing through said part.

Various embodiments of key mountings according to the invention, chosen by way of example, are illustrated in the accompanying drawings, in which.

Figure 7:
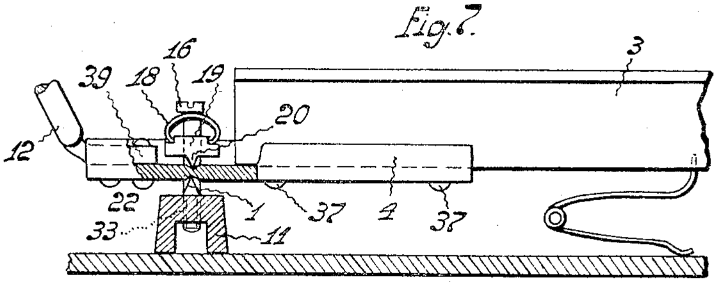
Figures 8, 9:
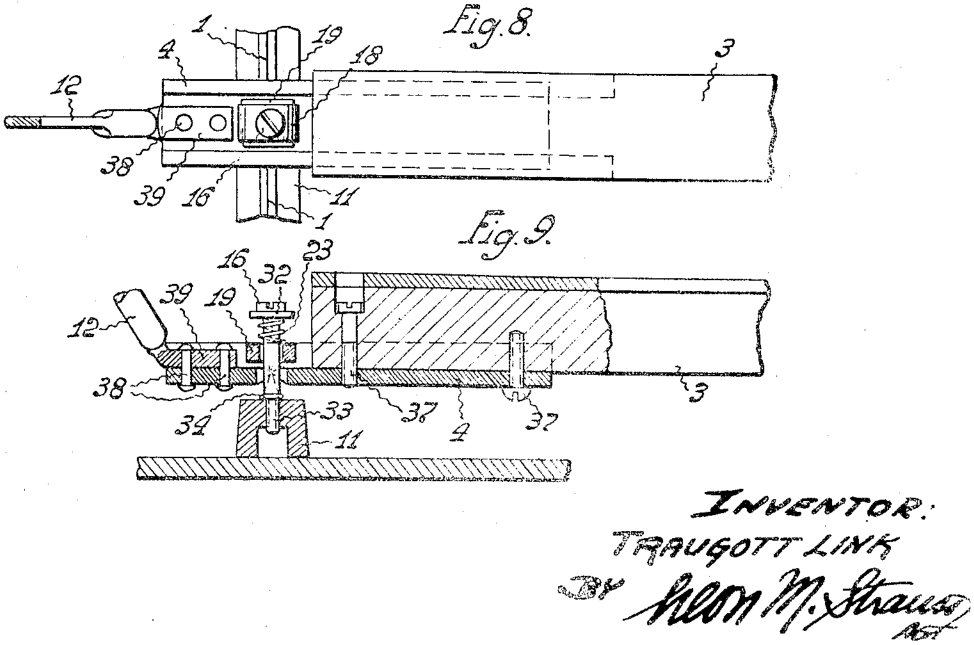
Figure 10:
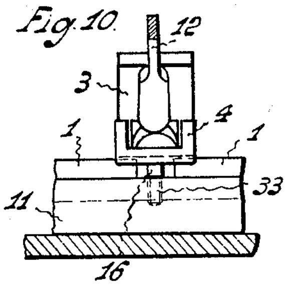
Figure 11:
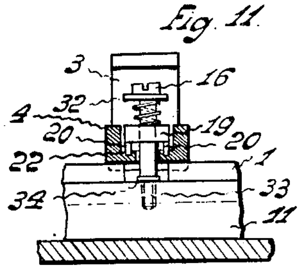

Figures 7 and 8, respectively, show a second embodiment of the key mounting according to the invention, in elevation and in top plan views;

Figures 9 to 11 show a third form of a key mounting of which

Figure 9 is a longitudinal section;

Figure 10 is a view in elevation, as seen from the key-wire end; and

Figure 12:
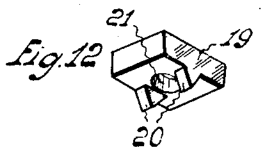
Figure 13:
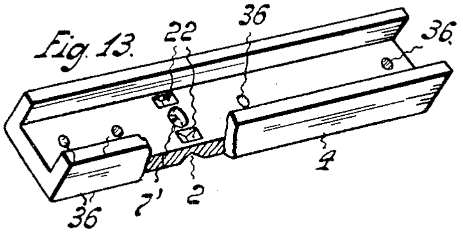
Figure 14:
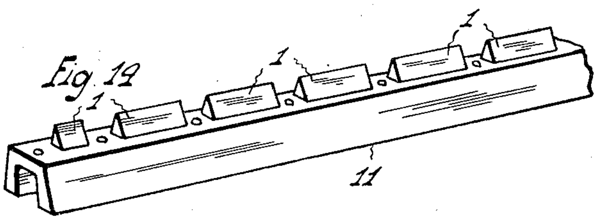
Figure 19:
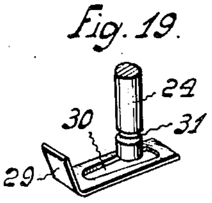
Figure 20:
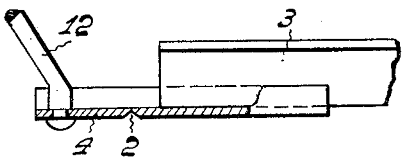
Figures 21, 22:
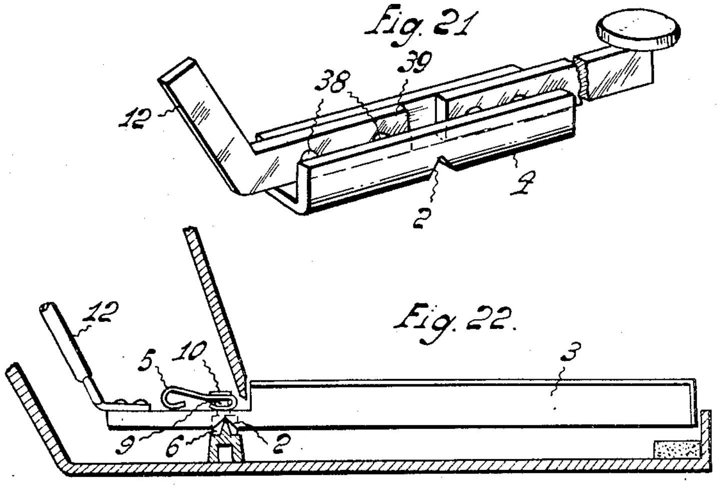
Figure 23:
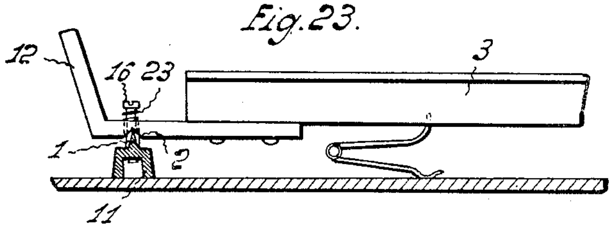

Figure 11 a cross-section;

Figure 12 is a perspective view of a block;

Figure 13 is a perspective view of a modified form of a member forming the connection between the key-wire and the key;

Figure 14 shows the member carrying the knife-edges in the embodiment according to Figures 9 to 11;

Figures 15 to 18 are views in lateral elevation, partly in section, of four further modified forms of the key mounting;

Figure 19 is a perspective view of means for locking a holder formed as a screw;

Figure 20 is a lateral elevation, partly in section, of a means of connecting the key-wire to the connection part;

Figure 21 is a perspective view showing another means of connecting the key-wire and the connection part;

Figure 22 shows an embodiment in which the part connected to the key is integral with the key; and Figure 23 shows an embodiment in which the key-wire is directly connected to the key.

Figure 5:
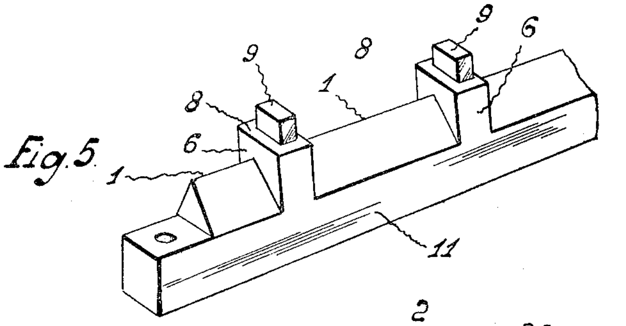
Figure 5 is a view, on a larger scale, of the knife-edges and those parts which may be integral with them.

Referring now more particularly to the drawings, there is disclosed a first embodiment of the invention, illustrated in Figures 1 to 3 and Figure 5. On part 6 rigid with the fixed knife-edges 1 there is provided a leaf spring 5 which presses on a connecting element 4, to which is attached a key 3 and which is provided with notches 2 for cooperation with said knife-edges. This part 6 may, as shown in Figure 5, be integral with the fixed knife-edges 1 and with a bar 11 or like support on which the knife-edges 1 are arranged, and each of the knife-edges 1 may also be integral with an adjacent knife-edge 1 which is not separated from it by a part 6. For instance, a single member, provided with all of the knife-edges 1 and all of the parts 6 rigidly connected with them, may be pressed, cast, injection-moulded or manufactured in any other suitable manner from metal or synthetic material.

Figure 2:
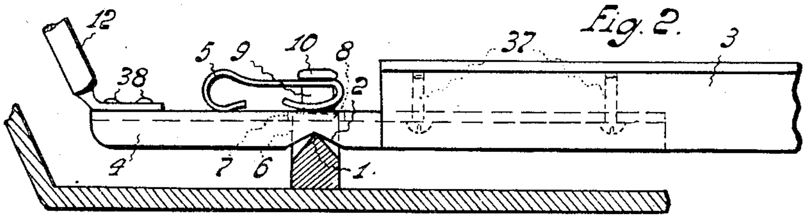
Figure 2 is a side elevational view of Fig. 1, partly in section.
Figure 3:
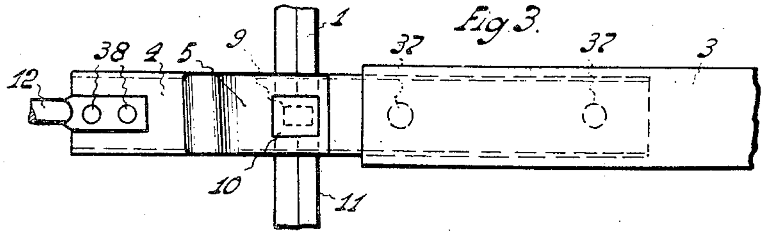
Figure 3 is an enlarged, fragmentary top plan view of a key mounting, seen in Fig. 1.

Channel-shaped connecting part 4 is provided with a web having an aperture 7 and with lateral flanges. The cross-section of part 6 in a direction transverse to the knife-edges is of rectilinear form and corresponds to the shape of aperture 7 in said connecting element 4 (Figure 5). This formation has the advantage that the key 3 extending from part 4 is secured against displacement in the direction of the knife-edge line and against twisting. Furthermore, the part 6 rigidly connected to the fixed knife-edges 1 is provided with a shoulder 8 above the connecting element 4 (Figure 5). The leaf spring 5 placed on this shoulder 8 is provided with an aperture corresponding to a reduced part 9 of the rigidly arranged part 6. In the embodiment according to Figures 2, 3 and 22 the leaf spring 5 is held on its seat, i. e. the shoulder 8, by means of a head-shaped formation 10 extending from said reduced part 9 (Figure 2). If the part 6 rigidly connected with the knife-edges 1 consists of a thermoplastic synthetic material, this head-shaped formation 10 may be produced by heating the material at this point and spreading it out by pressure. If the part 6 is made of metal, the head-shaped formation 10 may be produced by riveting.

Figure 4:
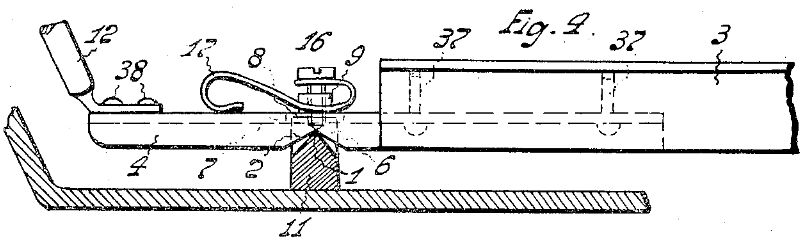
Figure 4 is a side elevation, partly in section, of a key mounting with adjustable resilient pressure.

Obviously, a releasable screw connection between the plate or leaf spring 5 and the reduced part 9 may alternatively be employed (Figure 4).

The free curved end of the leaf spring 5, which presses on the connecting element 4, extends in the direction of the key-wire 12. In this embodiment, therefore, the spring which in other cases is provided under the key (Figures 7 and 23) and presses the key upwards, is dispensed with by the special formation and arrangement of the leaf spring 5.

Figure 1:
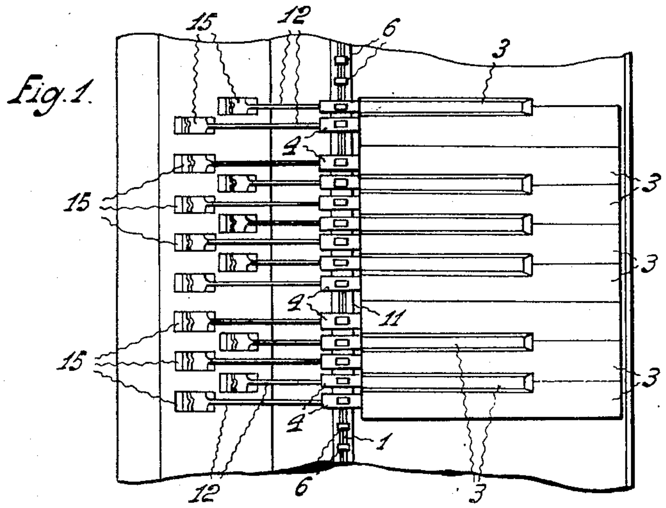
Figure 1 is a top plan view of a part of the key mounting according to the invention and employable in an accordion.

As shown in Figure 1, both the white keys and also the black keys are mounted on one series of knife-edges lying on a single straight line. The air-flaps 15 carried by the ends of the key-wires 12 are arranged in a known manner.

As regards the formation of the separate means by which the knife-edges and the parts conjugate therewith are pressed against one another, still further forms of construction are illustrated in Figures 4, 7 to 11, 15 to 18 and 23, all of these forms having in common the fact that the part which is rigidly connected to the fixed knife-edges and which passes through the key 3 or the connecting part 4 consists of a screw 16 or the like arranged rigidly between the knife-edges 1 of a knife-edge pair and that the counter-holder held by this screw 16 or the like and pressing on the key 3 or the connecting element 4 is formed by a spring which presses directly or indirectly on the key 3 or the connecting element 4.

In the embodiment according to Figure 4, the counter-holder is formed by an S-shaped leaf spring 17, the holder, which in this case is formed as a screw 16, passing through both sides of one loop of the S. The screw 16 is mounted in the part 6 and the free end of the resilient loop through which the screw bolt 16 passes twice bears against the head of this screw. The stress in the spring 17 can be adjusted by turning the screw 16.

According to Figures 7 and 8, the counter-holder is formed by a bow spring 18 which presses on the connecting element 4 through an intermediate block 19. This block 19 is provided with a knife-edge on its under side or preferably with two knife-edges 20, as shown in Figure 12, separated from each other by a bore 21 through which passes the screw 16 or the like formed as a holder. These knife-edges 20 engage in conjugate recesses 22 provided on the upper side of the connection part 4 (Figures 7, 11 and 13).

Figures 9, 15 to 18, and 23 show embodiments in which a helical spring 23, placed round the screw 16 and pressing on the connecting element 4, takes the place of the bow spring 18. For better mounting of the spring 23, a small disc 32 serving as a spring abutment plate and bearing against the head of the screw 16 may be used.

In Figures 15 to 18 and 23 embodiments are shown in which the helical spring 23 presses directly on the connecting element, which in the case of Figure 23 is formed by the key-wire 12.

Figure 18:
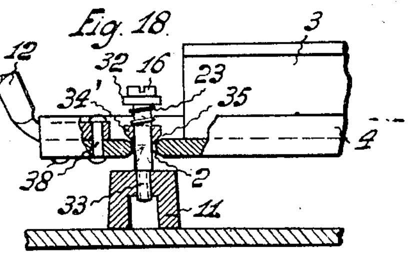

In the embodiments according to Figures 7, 9 and 18, in which the rigid part releasably connected to the knife-edges 1 is formed by a screw 16, it is advisable to provide threads 33 only on that part of the shank of the screw 16 which enters the bar 11 carrying the knife-edges 1, and to provide a deformation 34, at the point where the threads 33 terminate, while the smooth part of the shank begins (see Figures 9 and 11), after the spring 18 or 23, and, if present, the spring plate 32 and the block 19, have been slid onto the shank of the screw 16. The mentioned deformation, which may, for instance, consist of a notch provided in the material of the shank by pressing same outwardly, has the advantage that when a screw 16 is unscrewed in order to remove a key 3, the parts through which the screw 16 passes will not slide down it and fall off. This arrangement is very advantageous for assembling and for effecting repairs.

Figure 15:
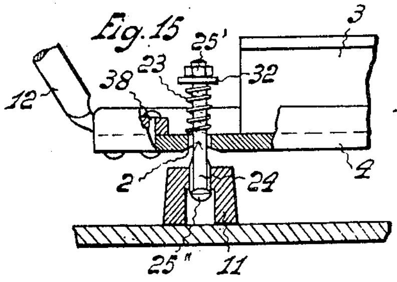
Figure 16:
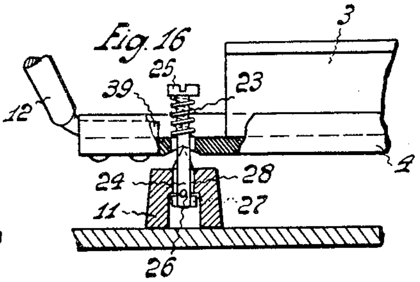
Figure 17:
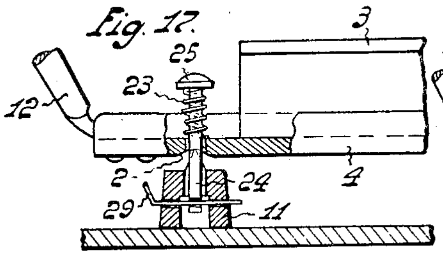

Figures 15 to 17 show embodiments in which instead of the screw 16 a bolt 24 is used as a holder, this bolt passing freely through the connecting element 4 and being anchored in the web or transverse portion of the bar 11. The bolt 24 holds the spring 23, acting as a counter-holder, by means of a nut 25′ screwed onto the bolt (Figure 15) or by means of a head 25 (Figure 17).

For anchoring the bolt 24 in the web of the bar 11, the bottom end of the bolt is provided, in the embodiment shown in Figure 15, with a head 25″. In the embodiment shown in Figure 16, either the bottom end of the bolt is provided with an insertable transverse pin 26, a split pin, or the like, which is drawn by the spring 23 into a groove in the web of the bar 11 after the bolt has been turned through 90°, or else the bolt is provided, as shown in dot-dash lines, with a rectangular extension 27 which is passed through the aperture 28 of the bar 11, this aperture being of the same shape, and then, after the bolt 24 has been turned through 90°, is pulled against the web by the spring 23; in the latter case also, the web may be provided with a suitable depression.

Figure 17 shows an embodiment in which the bolt 24 is anchored in the bar 11 by means of a locking bar 29 in the form of a slider, arranged so as to be capable of sliding in the arms or flanges of the bar 11. The locking bar 29 is provided with an aperture 30, tapering towards one end, through which the end of the bolt is passed, the bolt end being provided with a peripheral groove 31 into which the edges of the aperture 30 enter when the locking bar 29 is displaced, whereby the bolt 24 is anchored (Figure 19).

Figure 18 shows an embodiment in which the spring presses against the connecting element 4 through an intermediate centering cone 34′ of which the outer surface bears against a conical bore 35 in the connecting element 4.

Figure 6:
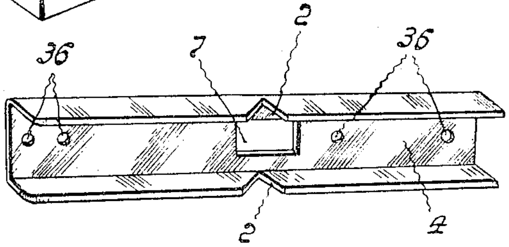
Figure 6 is a perspective view of a member connecting the key with the key-wire.

The connecting element 4 of the key 3 is preferably U-shaped in cross section, as shown more especially in Figures 6, 13 and 21. Two possible ways in which this connecting element 4 may be attached to the key 3 are shown in the drawings.

The connecting element 4 may be provided with the notches 2, conjugate with the knife-edges, on the arms of its U-shaped section, as shown in Figure 6. This formation of the connecting element 4 is preferred for the embodiments of the key mounting according to Figures 1 to 4. Correspondingly, the web of the connection member 4 is provided with a preferably rectangular aperture 7.

Alternatively, however, this connecting element 4 may carry the notches 2 on the outer side of its web, as shown in Figure 13. In this case, the connecting element 4 is so arranged that its arms project upwards and the end of the key 3 is laid in the section from above and attached as shown in Figures 7 to 9, 15 to 18, and 20. This formation of the connection member 4 is preferred for those embodiments of the key mounting in which the part connected with the fixed knife edges 1 is formed by a screw 16 or a bolt 24. Accordingly, when the connecting element 4 is formed in this manner the web is provided with a bore for the screw 16 or the bolt 24; the dimensions of this bore must be sufficiently large to enable the connecting element 4 to rock on the knife-edges 1.

Holes 36 provided in the connecting element 4 (Figure 13) are used for attaching the key 3 by means of screws 37 (Figures 2 to 4, 7 and 9) and/or for attaching the key-wire 12 by means of rivets 38 (see for instance Figures 9 and 18).

The means for connecting the key-wire 12 to the connecting element 4, which is U-shaped in cross-section for its major part between the key 3 and the key-wire 12, may be formed in various ways. The end 39 of the key-wire 12 adjacent to this member 4 is preferably made flat and may be attached to the web of the connection member 4 by means of rivets 38 for intance. In this case the key-wire 12 may be made flat in the direction of pivoting of the key 3 and its flat end 39 may be twisted through 90° out of the plane of pivoting of the key 3, as may be seen for instance in Figures 7 to 9 and 15 to 18. Alternatively, however, the whole key-wire 12 including its end 39 may be made flat, without twisting, in such a manner that the end 39 runs parallel to the web of the connecting element 4.

Such a construction is shown in Figure 21, in which the key-wire 12 is flat and is not twisted, but the wide surfaces of the key-wire 12 lie parallel to the plane of pivoting of the key 3, so that the key-wire 12 is attached to and in contact with one flange or arm of the connecting element 4. This embodiment is particularly advantageous from the point of view of manufacture.

Alternatively, however, the key-wire 12 may be bent down at the end and riveted into the web of the connection member 4 (Figure 20). A further possibility is that as shown in Figure 23 the connecting element may be formed by a flat end of the key-wire 12 which in this case is provided with the notches 2 conjugate with the knife-edges.

The connecting element 4 instead of being integral with the key-wire 12 may be integral with the key 3. In this case the embodiment according to Fig. 22 results, in which the surface of the key 3 is stepped near the notches 2 conjugate with the knife-edges, in such a manner that in the embodiment illustrated means for pressing against one another the knife-edges and conjugate notches, part 6 rigidly connected to the knife-edges, and the leaf spring 5, are all mounted at a level below the playing surface of the key 3. This embodiment provides the advantage that the cover 13 of the accordion can cover the stepped part of the key 3, so that when the key 3 is pressed down no opening becomes visible at the bottom edge of this part of the cover 13.

The above remarks obviously apply also to the other arrangements described previously.

All forms of construction can also be employed for keyboards having keys in the form of buttons. In such cases, the lever carrying the button, corresponds to the key.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. Means for mounting a key of a musical instrument on a key bed; comprising a support for engagement with said key bed and provided with at least one pair of spaced apart and projecting, substantially knife-edge shaped portions, first means connected to said support and extending beyond and between said spaced portions, means for carrying said key and provided with a pair of spaced notches engageable with adjacent knife-edge portions on said support and further provided with an aperture disposed between said notches and engageable with said first means, and second means associated with said first means for joining said carrying means with said support and for urging engagement of said notches with said knife-edge portions during movement of said key, said second means being disposed so that the direction of pressure effecting said engagement passes substantially through the line joining said knife-edge portions.

2. Means for mounting at least two keys of a musical instrument on a key bed; comprising a support for engagement with said key bed and having a plurality of pairs of spaced apart, substantially knife-edge shaped projecting portions, first means connected to said support and extending between each pair of said spaced portions and beyond the latter, respective means for carrying said keys, each carrying means provided with a pair of spaced notches engageable with a respective pair of spaced knife-edge portions and further provided with an aperture disposed between adjacent notches and engageable with a respective first means, and respective second means associated with said first means for joining said carrying means with said support and for urging engagement of the respective notches with a respective pair of said knife-edge portions during movement of a respective key, said second means being so disposed relative to respective first means that the direction of pressure effecting said engagement passes substantially through the line joining the knife-edge portions of each pair, respectively, to thereby permit mounting and dismounting of each of said keys independently of the other of said keys and to prevent displacement and tilting of said keys in lateral direction to said support.

3. Mounting means according to claim 2, said first means including fastening means for engagement with said support and spaced from said key bed.

4. Mounting means according to claim 2, said first means being integral with said support and occupying the space between adjacent knife edge portions of said support.

5. Mounting means according to claim 2, said carrying means being channel-shaped and defining a pair of lateral flanges, said notches being disposed on said lateral flanges, said support comprising a channel shaped member including a web portion, said spaced knife-edge portions being disposed on said web portion.

6. Mounting means according to claim 3, said support comprising a channel shaped member including a web portion, said spaced knife-edge portions being disposed on said web portion, said web portion including respective apertures disposed each between a respective pair of said knife-edge portions for reception of respective fastening means.

7. Mounting means according to claim 6, said fastening means being rotatable within said aperture and including a portion adapted to underlie a respective portion of said web portion adjacent said aperture in a predetermined position of angular rotation, to thereby removably anchor said carrying means to said support.

8. Mounting means according to claim 7, said fastening means comprising a bolt provided with an enlarged head end, and said second means comprising a coil spring having one end in abutment against said enlarged head end and its opposite end in abutment against said carrying means.

References Cited in the file of this patent

UNITED STATES PATENTS

| | | |
|---|---|---|
| 130,928 | Manning | Aug. 27, 1872 |
| 1,561,100 | Mills | Nov. 10, 1925 |
| 2,117,002 | Hammond | May 10, 1938 |
| 2,478,474 | Felder | Aug. 9, 1949 |

FOREIGN PATENTS

| | | |
|---|---|---|
| 414,974 | Italy | Sept. 5, 1946 |
| 415,734 | Italy | Nov. 1, 1946 |
| 418,348 | Italy | Feb. 15, 1947 |